US008619792B1

(12) United States Patent
Gallimore et al.

(10) Patent No.: US 8,619,792 B1
(45) Date of Patent: Dec. 31, 2013

(54) SELECTIVE MULTI-MODAL TRANSMISSION ALTERATION

(75) Inventors: Ian Gallimore, Palmyra, PA (US); Jared Scott Marmen, Bel Air, MD (US)

(73) Assignee: Coherent Technical Services, Inc., Lexington Park, MD (US)

( * ) Notice: Subject to any disclaimer, the term of this patent is extended or adjusted under 35 U.S.C. 154(b) by 576 days.

(21) Appl. No.: 12/352,728

(22) Filed: Jan. 13, 2009

(51) Int. Cl.
*H04L 12/28* (2006.01)

(52) U.S. Cl.
USPC .......................................... 370/400; 370/465

(58) Field of Classification Search
None
See application file for complete search history.

(56) References Cited

U.S. PATENT DOCUMENTS

| | | | |
|---|---|---|---|
| 6,104,716 A * | 8/2000 | Crichton et al. | 370/401 |
| 7,230,923 B2 * | 6/2007 | Onvural et al. | 370/235 |
| 7,551,575 B1 * | 6/2009 | Aleksandrowicz | 370/321 |
| 7,551,989 B2 | 6/2009 | Knotts et al. | |
| 8,037,492 B2 * | 10/2011 | Lash et al. | 725/36 |
| 8,194,662 B2 * | 6/2012 | Ilnickl et al. | 370/392 |
| 2002/0163890 A1 * | 11/2002 | Yoshimoto et al. | 370/241 |
| 2006/0248582 A1 * | 11/2006 | Panjwani et al. | 726/13 |
| 2007/0088467 A1 | 4/2007 | Knotts | |
| 2007/0206496 A1 * | 9/2007 | Roy et al. | 370/229 |
| 2007/0258445 A1 * | 11/2007 | Smith et al. | 370/389 |
| 2010/0174838 A1 * | 7/2010 | Emma | 710/107 |
| 2010/0226386 A1 * | 9/2010 | Stoica | 370/431 |

OTHER PUBLICATIONS

The World of Avionics Communication in your Hand; MIL-STD-1553, MIL-STD-1760 STANAG 3838 Dual Repeater-Splitter & RS-232 Bus Analyzer. Online; Retrieved from the Internet Feb. 11, 2009, 2 pages, http://www.bmccorp.com/specs/repeater.html.
NetAcquire Corporation—Distributed Systems for Test, Measurement and Communications. Online; Retrieved from the Internet Feb. 11, 2009, 1 page, http://www.netacquire.com/.
Gallimore, Ian, Aircraft Application of MIL-STD-1553, Naval Air Warfare Center Aircraft DIX Patuxent River, MD, May 31, 1996 publication, 5 pages. Online; Retrieved from the Internet Feb. 11, 2009. http://oai.dtic.mil/oai/oai?&verb=getRecord &metadataPrefix=html&identifier=ADA314058.

* cited by examiner

*Primary Examiner* — Gregory Sefcheck
*Assistant Examiner* — Daniel Mitchell
(74) *Attorney, Agent, or Firm* — Workman Nydegger (57) ABSTRACT

System and methods for an interface alteration device that recognizes in incoming data whether certain predefined conditions exist based on condition evaluation rules, and, as appropriate, alters certain portions of the incoming data based on alteration rules. Transmission tolerance levels also define how transmission of data is to be performed so that the destination node to which the altered and/or unaltered data is transmitted will be unaware that alteration has occurred to the data stream.

19 Claims, 7 Drawing Sheets

SELECTIVE MULTI-MODAL TRANSMISSION ALTERATION

The U.S. Government has a paid-up license in this invention and the right in limited circumstances to require the patent owner to license others on reasonable terms as provided for by the terms of Contract No. W9124G-07-C-0006 awarded by the U.S. Army Aviation Technical Test Center.

REFERENCE TO CROSS-RELATED APPLICATIONS

None

BACKGROUND OF THE INVENTION

1. The Field of the Invention

The present invention generally relates to altering data in a transmission between network nodes. In particular, embodiments relate to enabling multiple modes of data transmission alteration based on recognized conditions without the destination node being aware of the resulting altered transmission.

2. The Related Technology

In network communications, one problem is being able to alter data in a communication line between nodes of a system without producing other detrimental effects. Detrimental effects can be any anomaly observed regarding the transmission state of the altered data as compared to the transmission state of the original data that would be detectable by a destination node. For example, one problem that can occur when altering data in a communication line is introducing latency during the alteration process. Latency can potentially disrupt operation of a node or the system of nodes. Further, the latency requirement can be stringent for information that is used to synchronize events between nodes. For example, consider the situation where synchronization is keyed to a feature in the information, e.g., "synchronize on receipt of the last bit", etc. Some systems experience latency by waiting for data to be transmitted to the data alteration device. Other systems experience latency due to buffering systems. Other detrimental effects can include signals being received out of order, signals being transmitted at too high of transmission levels or too low of transmission levels, and the like.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY OF SOME EXAMPLE EMBODIMENTS

In general, example embodiments relate to systems and methods for performing selective multi-modal transmission alterations. In particular, embodiments relate to enabling multiple modes of data transmission alteration based on recognized conditions without the destination node being aware of the resulting altered transmission.

One embodiment of the invention provides a system configured to be placed between a first segment and a second segment of a communication line, the communication line being placed between a first node and a second node of a network, the system including a) a first port configured to receive incoming data from a first segment of a communication line, the incoming data entering with a signal protocol, b) an interface alteration processor configured to identify condition evaluation rules corresponding to the signal protocol, use the condition evaluation rules to determine whether one or more predefined conditions exists and which portions of the incoming data should be transmitted onto the second segment of the communication line as unaltered data or as altered data, for any portions of the alterable portion of the incoming data that should be transmitted as unaltered data, copy original data of the incoming data corresponding to the unaltered data portions, for any portions of the alterable portion of the incoming data that should be transmitted as altered data, identify alteration rules and generate altered data according to the alteration rules, and determine a transmission tolerance level based on at least one of the signal protocol and/or a system-level protocol by which the altered data and/or unaltered data should be transmitted onto the second segment of the communication line, and 3) a second port configured to transmit the unaltered data and/or altered data onto the second segment of the communication line to be delivered to the second node according to the transmission tolerance level.

Another embodiment of the invention includes a method for altering data in a communication line between a first node and a second node, the method including a) receiving incoming data from a first segment of a communication line, the incoming data entering with a signal protocol, b) identifying condition evaluation rules corresponding to the signal protocol to determine an evaluation portion of the incoming data, c) transmitting the evaluation portion of the incoming data onto a second segment of the communication line, d) while the evaluation portion is being transmitted, analyzing the evaluation portion to determine whether one or more predefined conditions exist in the evaluation portion and to determine whether an alterable portion of the incoming data exists, e) while the evaluation portion is being transmitted, determining which portions of the alterable portion of the incoming data should be transmitted onto the second segment of the communication line as unaltered data or as altered data, f) for any portions of the alterable portion of the incoming data that should be transmitted as unaltered data, copying original data of the incoming data corresponding to the unaltered data portions, and transmitting the copied data onto the second segment of the communication line, and g) for any portions of the alterable portion of the incoming data that should be transmitted as altered data, identifying alteration rules, generating altered data according to the alteration rules, and transmitting the altered data onto the second segment of the communication line instead of original data of the incoming data corresponding to the altered data portions.

Yet another embodiment of the invention includes a method for altering data in a communication line between a first node and a second node, the method including a) at an initial time, receiving incoming data from a first segment of a communication line, the incoming data entering with a signal protocol, b) identifying an evaluation portion of the incoming data based on the signal protocol, c) analyzing the evaluation portion to determine whether one or more predefined conditions exists and whether an alterable portion of the incoming data exists, d) determining which portions of the alterable portion of the incoming data should be transmitted onto the second segment of the communication line as unaltered data or as altered data, e) identifying a transmission tolerance level associated with at least one of the signal protocol and/or a system-level protocol, f) transmitting the evaluation portion of the incoming data onto a second segment of the communication line, g) for any portions of the alterable portion of the incoming data that should be transmitted as unaltered data, copying original data of the incoming data corresponding to the unaltered data portions, and transmitting the copied data onto the second segment of the communication line, h) for any portions of the alterable portion of the incoming data that should be transmitted as altered data, identifying alteration rules, generating altered data according to the alteration rules, and transmitting the altered data onto the second segment of the communication line instead of original data of the incoming data corresponding to the altered data portions, and i) wherein the evaluation portion, copied data and/or altered data are transmitted at a point in time after the initial time that satisfies the transmission tolerance level associated with the signal protocol and/or the system-level protocol.

Additional features of the invention will be set forth in the description which follows, and in part will be obvious from the description, or may be learned by the practice of the invention. The features of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

The principles of the embodiments described herein describe the structure and operation of several examples used to illustrate the present invention. It should be understood that the drawings are diagrammatic and schematic representations of such example embodiments and, accordingly, are not limiting of the scope of the present invention, nor are the drawings necessarily drawn to scale. Detailed description of well-known devices and processes have been excluded so as not to obscure the discussion in details that would be known to one of ordinary skill in the art.

The present invention is broadly directed to altering data in a communication line of a network. In particular, embodiments of the invention selectively alter data in a communication line based on recognized conditions without the destination node being aware that an alteration has occurred. This includes minimizing any detrimental effects of the alteration, including latency, order of transmission, and transmission levels. Furthermore, the present invention allows alteration of data to occur in various modes. The invention also preserves the integrity of information that is passed through network system without being altered. In addition, the present invention provides for scalability to multiple communication lines as well as multiple transmission protocols.

Figure 1:
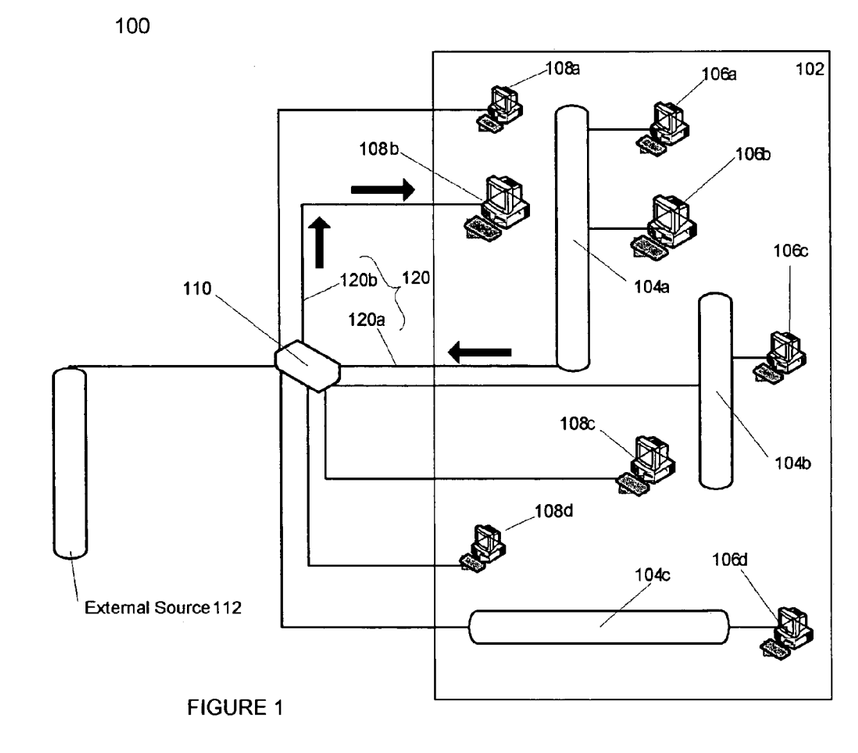
FIG. 1 illustrates an example of a network environment in which interface alteration devices incorporating features of the invention may be implemented.

FIG. 1 illustrates one exemplary environment in which the features of the invention can be practiced. FIG. 1 illustrates a network 100 showing a system 102 having one or more buses 104a-c. Each bus 104a-c is connected to a processing terminal, referenced as terminals 106a-d. Further, one or more processing terminals 108a-d may be networked in the system 102 without being connected directly to a bus. Buses 104a-c, terminals 106a-d, and terminals 108a-d are thus exemplary of nodes of a system 102. An interface alteration device 110 is inserted into one or more communication lines in the system 102 to break the communication lines into two segments that can then be handled in isolation. The interface alteration device 110 can break communication lines at any location in system 102. Furthermore, interface alteration device 110 is scalable in that it includes data interfaces that allow breaks in as many communication lines as needed control the state of the system 102.

As used herein, the term "communication line" refers to any means for allowing information or data to be transmitted to and/or from nodes in a system. As such, a line is used diagrammatically to illustrate that communication can occur between system nodes. However, the use of a solid line is used by way of illustration and not by way of limitation. The communication line can be any physical or wireless connection used to transmit data. "Data," "information," or "instructions" can be transmitted on the communication line as "signals." These terms may be used interchangeably herein to refer to any data that can be carried in the communication line, which can be transmitted in the form of, but not limited to, electrical signals, optical signals, acoustic signals, pressure signals, radio signals, carrier wave signals, pneumatic signals, and the like, depending on the transmission medium of the communication line. Furthermore, the communication line can carry signals using various formats, such as continuous analog, digital, discrete, matrixed, multiplexed, and the like, depending on the transmission medium.

Generally, the signals will be transmitted according to a "protocol" which enables both transmitting node and receiving node to communicate. For signals formatted in digital format, protocol generally defines error checking methods, data compression methods, how the transmitting node will signal data transmission completion, how the receiving node will acknowledge receipt of the data, and the like. For signals in a continuous analog format, the protocol could define ranges of voltage and current values and transmission bandwidth (e.g., 1 Hz, 10 kHz, 1.5 GHz). Those of skill in the art will appreciate that other protocols can be identified and/or determined based on the signaling format.

FIG. 1 illustrates that the interface alteration device 110 can be connected to more than one communication line, although in some embodiments, the interface alteration device 110 can be placed in a single communication line. The interface alteration device 110 may break one or many communication lines in parallel at the same time. As described further below, the interface alteration device 110 may itself be isolated from the communication line using a set of relays used to insert or remove the interface alteration device 110 from the communication line; these relays can be controlled from the interface alteration device 110 or an alternate external source.

The data received from a segment can be selectively altered before being sent on the other segment, based on 1) condition evaluation rules containing instructions on how to evaluate incoming data to determine whether one or more predefined conditions exists and determine which portions of the incoming data should be transmitted onto the second segment of the communication line as unaltered data or as altered data and 2) alteration rules which contains instructions on how to alter the data; both of which can be stored locally or could be received remotely from an external source. FIG. 1 shows that in one embodiment, the interface alteration device 110 can communicate with an external source 112 in order to receive condition evaluation rules and/or alteration rules. In one embodiment, information can be pushed/pulled to and/or from the external source 112 in real time, or can be transmitted on a scheduled basis, or as needed. As used herein, the term "external source" refers to a network or system which communicates with the interface alteration device to provide condition evaluation rules, alteration rules, and/or transmission tolerance levels and does not communicate with other nodes of the system 102. It will be appreciated that the system 102 would otherwise be operational without the interface alteration device 110 and/or external source 112.

For illustrative purposes, the flow of data alteration will be described with respect to communication line 120. The interface alteration device 110 breaks communication line 120 into two isolated segments 120a and 120b, as shown in FIG. 1. In this example, the interface alteration device 110 is analyzing data that is flowing in the direction indicated by the arrow. Thus, without interface alteration device 110, the data would flow directly from bus 104a (the source node) to terminal 108b (the destination node). Incoming data received from the first segment 120a from the source node is analyzed by the interface alteration device 110 using condition evaluation rules to determine whether one or more predefined conditions indicate that the incoming data should be altered or unaltered. If so, the interface alteration device 110 alters the incoming data according to alteration rules to generate altered data. The interface alteration device 110 then transmits the altered data and/or unaltered data on the second segment 120b to the destination node based on transmission tolerance levels to minimize detrimental effects, described further below, such that the destination node is not able to detect that the altered data was in fact altered from the original data. Existing nodes using the communication line are unaware that the communication line has been broken and unaware that data has been altered from its original state. Altering the signal allows a user to thus alter the operating state of nodes of the system.

It will be appreciated that each communication line will generally be able to allow bi-directional communication and that the uni-directional flow of data from bus 104a to terminal 108b is provided only to describe features of the invention. In the situation where communication lines allow bi-directional data flow, it is conceivable that each segment could be carrying original data and also altered data in either direction.

The interface alteration device can intelligently operate in multiple modes, which modes are not mutually exclusive of each other and can operate concurrently. The interface alteration device 110 may pass data through without alteration ("pass-through mode"); may pass some data unaltered while altering other data ("over-drive mode"); or may use one segment to transmit and/or receive information to/from a node even when the node is offline, inactive, or otherwise not present on the segment ("emulation mode").

Figure 2:
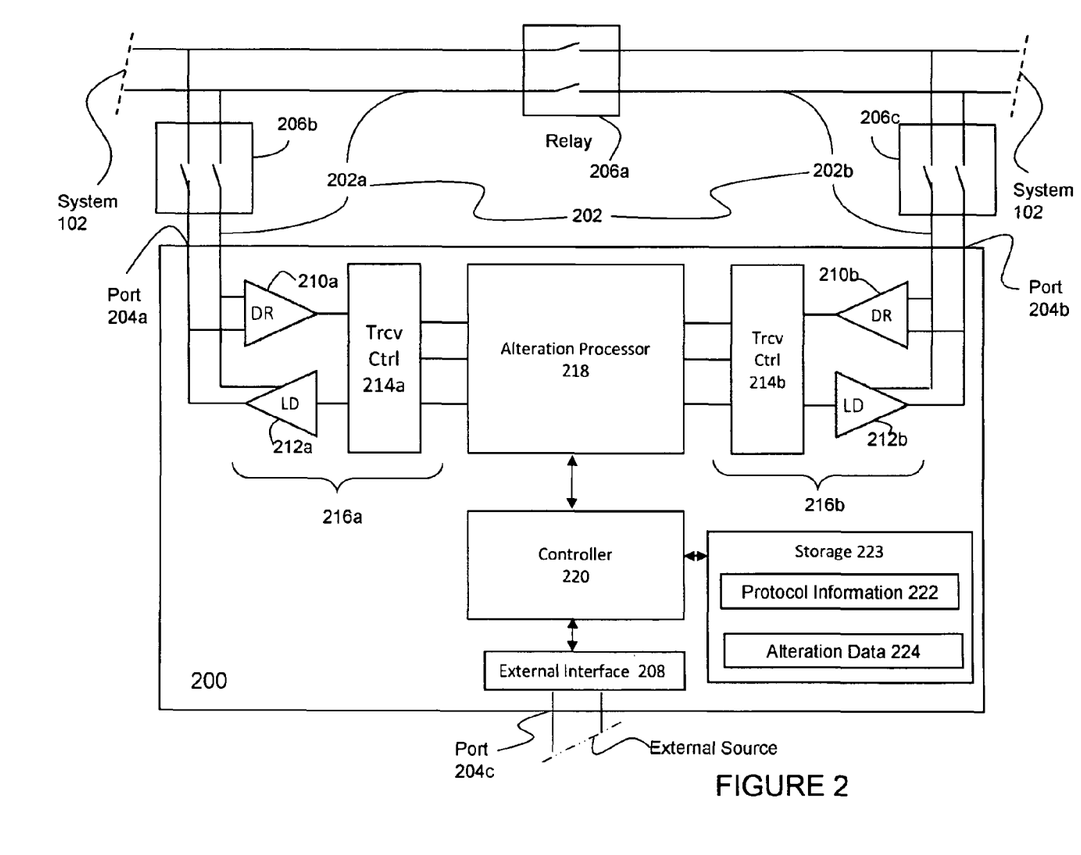
FIG. 2 illustrates an example of an interface alteration device incorporating features of the invention.

Turning to FIG. 2, the interface alteration device 110 is shown in further detail, indicated by reference numeral 200. As discussed above, a communication line 202 can be broken by the interface alteration device 200 into a first segment 202a and a second segment 202b, which both make up original communication line 202. FIG. 2 illustrates that the first segment 202a and second segment 202b are communicating with some aspect of system 102 shown in FIG. 1. The actual placement of interface alteration device 200 will depend on the protocol of the system in which it is placed. The communication line 202 allows bi-directional communication. Interface alteration device 200 has a first port 204a that connects to first segment 202a of communication line 202. Likewise, a second port 204b is provided that connects to second segment 202b of communication line 202.

Interface alteration device 200 can be connected directly to segments 202a and 202b of communication line 202. However, in another embodiment (shown in FIG. 2), interface alteration device 200 can be inserted into an original communication line 202 using a set of relays 206a, 206b, 206c appropriate to the transmission media of the communication line 202. These relays 206a-c can be used to assure removal of the interface alteration device 200 from the communication line 202 if necessary, for example due to safety or similar considerations. When the interface alteration device 200 is online, the relay 206a is taken offline and relays 206b and 206c are placed inline so that the data flow is forced through interface alteration device 200. When the relay 206a is offline, those of skill in the art will appreciate that relay 206a will provide termination.

In operation, the interface alteration device 200 receives original data on segments 202a, 202b of the communication line 202. In addition, as described further below, interface alteration device 200 recognizes whether certain predefined conditions exist based on condition evaluation rules, and, as appropriate, alters certain portions of the data based on alteration rules. Transmission tolerance levels can also define how transmission of data is to be performed so that the destination node will be unaware that alteration has occurred to the data stream. The interface alteration device 200 also transmits the outgoing original data and/or altered data on the opposing segment 202a or 202b. Further, the interface alteration device 200 receives and distributes information through the external interface 208. Each of these functions is further described as follows.

Interface alteration device 200 includes signal transceivers 216a, 216b connected to each port 204a, 204b, respectively. Each signal transceivers 216a, 216b includes a differential receiver 210a, 210b, a line driver 212a, 212b, and a transceiver control 214a, 214b, respectively. The signal transceivers 216a, 216b transmit and/or receive signals from segments 202a, 202b and convert signals from the original transmission media into signals that can be operated on within the interface alteration device 200. Further, the alteration processor 218 identifies outgoing signals intended to be transmitted through the segments 202a, 202b and converts the outgoing signals back into the original signal format to be sent by the appropriate transceiver 216a, 216b to the opposite segment 202a, 202b. The transceivers 216a, 216b may be of any suitable type for the original signal protocol and the alteration processor 218. For example, the transceivers 216a, 216b can be any suitable mix of electrical hardware, opto-electronic hardware, mechanical hardware, wireless hardware, vibration hardware, hydraulic hardware, acoustic hardware, and the like.

Alteration processor 218 uses condition evaluation rules to identify predefined conditions in which altered data needs to be generated and performs the desired alteration of data using alteration rules. The alteration processor 218 can include hardware such as a Field-Programmable Gate Array (FPGA), or any other Programmable Logic Device (PLD) acceptable and useful for implementing selective transmission alterations of the present invention in a special-purpose processor. Preferably, the hardware and/or software used to implement the alteration processor 218 is software programmable, able to handle serial and/or parallel interfaces, and have access to storage either internally in the chip or be able to access other storage. For example, one product that can produce programmable logic is the XILINX® FPGA chip. Additionally, the alteration can be implemented in a general-purpose processor if the through-put of the processor is sufficient. In one embodiment, when data comes in through transceivers 216a, 216b the incoming signals are processed by the alteration processor 218 by receiving incoming original data from one side of a communication line (e.g., segment 202a), accessing condition evaluation rules to determine whether the original data should be altered, using alteration rules to alter the original data to generate altered data, and transmitting the altered data to the other side of the communication line (e.g., segment 202b) according to transmission tolerance levels. In one embodiment, the interface alteration device 200 may determine that the original data does not need to be altered at all.

In another embodiment, a source node of the communication line may be idle or offline. The interface alteration device 200 may determine that data needs to be generated and transmitted on an outgoing segment of a communication line (e.g., segment 202b) to another destination node in order to influence the operation or state of the node. Note that in this embodiment, the term "original data" refers to the fact that only idle data or null data could be flowing to the destination node, so that the addition and/or modification of data on the communication line by the interface alteration device results in altered data. The modes in which the interface alteration device 200 can operate will be described in further detail below.

The controller 220 configures the alteration processor 218 according to condition evaluation rules 222 of the user received via the external interface 208. Thus, the controller 220 may store condition evaluation rules 222 in storage 223 located on the device 200. The controller 220 also receives, stores, and/or routes alteration rules 224 from the external interface 208. For example, the alteration rules 224 can be received from the external interface 208 and routed by the controller 220 to the alteration processor 218 for making alterations in the data stream when operating in the over-drive and emulation modes. Thus, interface alteration device 200 can include a third port 204c such that the controller 220 can receive from an external interface 208 the condition evaluation rules indicating predefined conditions to search for in the incoming data and portions of data that should be unaltered or altered, and/or the alteration rules used to alter the original data.

The controller 220 also communicates with external interface 208 to transmit and/or receive data to and/or from an external source via port 204c. The external interface 208 can incorporate any interface suitable to the function of the controller 220 and the external source.

Having described the components of the interface alteration device 200, the various modes in which the device 200 can operate will now be described in further detail. Generally, interface alteration device 200 can operate in pass-through mode; over-drive mode; and emulation mode.

When operating in pass-through mode, the alteration processor 218 receives an original signal (from segment 202a or 202b received via either transceiver 216a or 216b) from a receiving transceiver and determines whether the signals should be handled in pass-through mode. If so, the alteration processor 218 causes the transmitting transceiver to reproduce the signal to be transmitted by the opposite transceiver.

When operating in over-drive mode, the alteration processor 218 will alter at least a portion of the original signal based on condition evaluation rules and/or alteration rules. The alteration processor 218 receives an original signal (from segment 202a or 202b received via either transceiver 216a or 216b) and evaluates the original signal using condition evaluation rules to determine whether the original signal needs to be altered. If so, the alteration processor 218 alters the original signal using alteration rules. The alteration processor 218 transmits the altered data to the opposite transceiver from which the original signal arrived. The altering function may be desired only during a particular segment of time; in this case the alteration processor 218 recognizes predefined conditions when the altering function should be initiated.

When operating in emulation mode, the alteration processor 218 bases the emulation function on receipt of idle or null data as original data. Alteration processor 218 generates information to one or both segments 202a, 202b of a communication line based on condition evaluation rules and/or alteration rules. For example, the interface alteration device 200 may be registering idle data on a communication line and adds altered data to a segment of the communication line without having changed original incoming data.

Thus, as used herein, the term "original data" can include any data that is being analyzed by the interface alteration device. The term "condition evaluation rules" refers to one or more predefined conditions that the interface alteration device looks for in incoming data. For example, a predefined condition could be to identify a header element with a known bit pattern in a digital signal. Once the known bit pattern is identified, the condition evaluation rules may have rules that specify certain portions of the incoming data to be altered or unaltered. In another embodiment, a predefined condition could be a voltage level, current level, and/or bandwidth level of a continuous analog signal. Other examples are readily ascertainable based on the teachings herein.

The term "alteration rules" refers to how the data is to be altered, including any actual data that is used to add data to, delete data from, replace data, modify data, or otherwise change original data to form "altered data." "Altered data" that is thus generated can be all new data, or could be derived from the original data. "Altered data" can also refer to adding active data when the original incoming data is idle data or null data. Alteration rules also includes instructions or formulaic data that analyzes conditions such as the original data, history of the original data or any other condition present in the original data and/or signal protocol, and can algorithmically determine how to generate the altered data. Another example of use of condition evaluation rules could be using a matched filter to detect the conditions. Alteration rules would then include causing the signal to match a predefined pattern.

Condition evaluation rules and/or alteration rules can be received from the external source for storage at the interface alteration device, or can be used in a "just-in-time delivery mechanism" that meets the timing requirements of a transmission tolerance level associated with the appropriate signal protocol and/or system-level protocol (discussed below); or the condition evaluation rules and/or alteration rules can be already buffered, pre-programmed within the interface alteration device, or otherwise already locally stored at the time of evaluation/alteration.

Finally, an additional function of the alteration processor 218 is to identify when information received via either transceiver 216a, 216b should be passed to the controller 220 for distribution to the external source via external interface 208.

One aspect of the invention in any mode in which the interface alteration device 200 operates is to ensure that the outgoing transmissions from the device 200 do not cause detrimental effects. As mentioned above, detrimental effects can include, but are not limited latency in the original transmission, order of transmission, transmission characteristics, and the like. The "transmission tolerance level" can thus be derived from the signal protocol itself, and/or from system-level protocols not derivable from the signal protocol, such as, but not limited to, applications operating on system components, the capabilities of the system components, and the like. In one embodiment, the interface alteration device 200 can determine which of the signal protocol and/or system-level protocols defines the most stringent limitations and perform the transmission based on the most stringent protocol.

In one example, the transmission tolerance level may define the total delay that can be allowed in receiving, processing, and re-transmitting a signal by evaluating the signal protocol of the original signal, plus any limitations imposed by the other nodes on the original communication line, which collectively contribute in this example to the transmission tolerance level. In this example, the transmission tolerance level defines a set of time limits within which the interface alteration device 200 must operate to remain undetected when altering information moving to or from nodes or systems on the communication line 202. In addition to the signal protocol, system-level protocols may be enforced by other nodes or systems on the communication line; these limits may also need to be satisfied. The transmission tolerance level may therefore define a timing requirement by which original and/or altered data must be transmitted from the interface alteration device.

Further, for multi-packet transmissions, the "transmission tolerance level" may define an order of transmission. In some cases, this could result in some of the original and/or altered data being buffered for a period of time.

In addition, "transmission tolerance levels" may define acceptable transmission characteristics or levels. For a continuous analog signal, the signal protocol may require that the signal be within prescribed voltage limits, current limits, and/or a minimum bandwidth. Thus, a transmission tolerance level may be defined where the voltage of the outgoing signal may need to be reduced and/or increased to the required range of voltage. For example, the voltage limit may not be able to exceed 2.3 volts; where a signal exceeding 2.3 volts could cause a detrimental effect. So, in this example, if the signal exceeds 2.3 volts, the transmission tolerance level could require the transmission to be limited to 2.3 volts.

Importantly, the transmission tolerance level helps define timing, transmission orders, and/or signal characteristics which result in the destination node being unaware that the data stream has been analyzed and/or altered.

Figure 3:
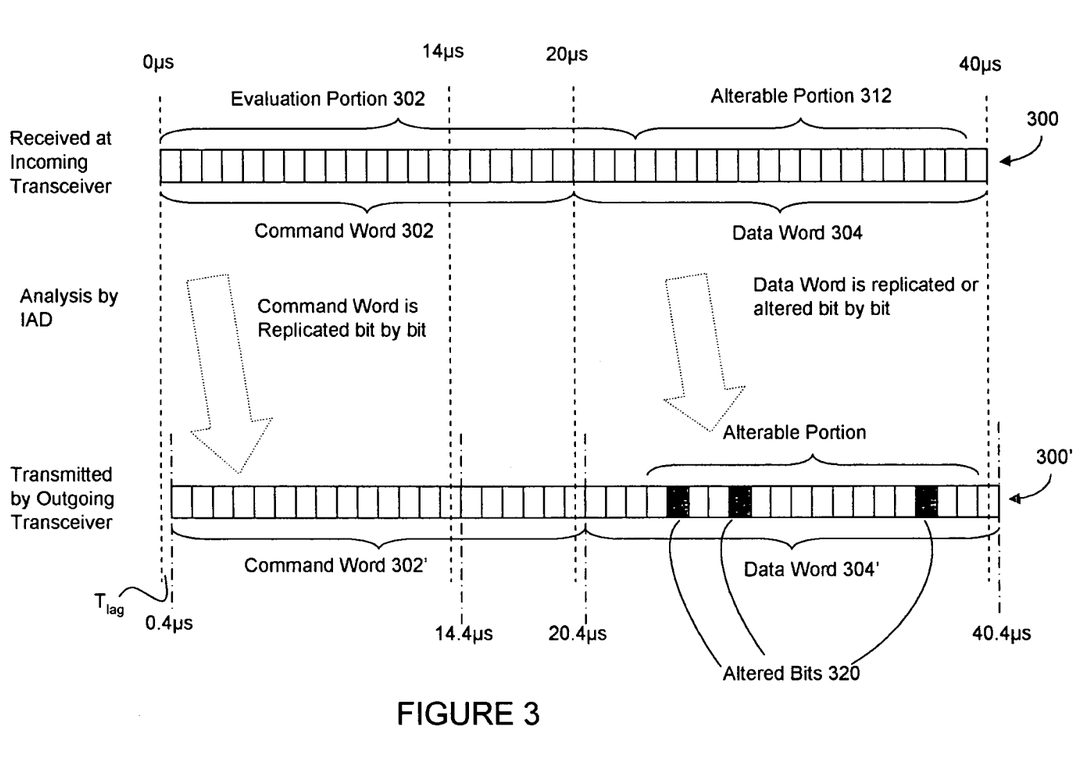
FIG. 3 illustrates an example of a timeline showing evaluation and alteration features of the present invention.

FIG. 3 illustrates one example of how the transmission tolerance levels could affect data alteration to occur without generating detrimental effects, such as latency. The example is described using MIL-STD-1553 protocol (hereinafter referred to as the "1553 protocol"). However, it will be appreciated that the broad teachings may apply to any other protocol to be able to implement the present invention and obtain similar advantages.

Generally, the 1553 protocol operates by having a bus controller issue a command, followed by one or more data words. When the command/data words are received by a destination node, the destination node issues a status word to acknowledge receipt of the command/data word. FIG. 3 illustrates original data 300 that is being received at $T_0=0$ μs by the receiving transceiver of the interface alteration device.

In the example of FIG. 3, when the receiving transceiver receives data, the transmitting transceiver retransmits the data substantially in real-time onto the outgoing segment of the communication line, shown as transmitted data 300'. For example, the transmitting transceiver can transmit at 9,600 Hz baud. This retransmission is shown in FIG. 3, in which the transmitting transceiver retransmits the first bit of the original data 300 a time $T_{lag}$ after the first bit is received by the receiving transceiver. In one embodiment, the interface alteration device has hardware and software that enables the transmitting transceiver to retransmit data received by the receiving transceiver faster than the timing requirements imposed the transmission tolerance level defined by the incoming protocol. For example, in one embodiment, the transmitting transceiver can replicate and transmit the incoming data 0.4 μs after the original data arrives at the receiving transceiver. If the 1553 protocol requires that transmission be received within +/−1 μs time limitation, the 0.4 μs lag created by the interface alteration device falls well within required time limits. The 0.4 μs lag is shown by way of example only. Note that FIG. 3 is not drawn to scale. Thus, while the interface alteration device could generate some amount of lag, such would not be a detrimental affect as long as it met the transmission tolerance level requirements.

FIG. 3 also illustrates that, in one embodiment, the transmitting transceiver retransmits the original data and/or altered data (indicated by altered bits 320) substantially in real-time. FIG. 3 illustrates the situation where altered data is generated and transmitted by the transmitting transceiver. However, the pass-through mode would look substantially similar to FIG. 3 except the altered bits 320 would instead be original data that was received, copied and retransmitted by the transmitting transceiver.

The following description will now describe how alteration occurs in the "over-drive" mode, using the 1553 protocol as an example. FIG. 3 shows original data 300 having a command word portion 302 and a data word portion 304. In this example, only one data word is shown. For the 1553 protocol, the data length is 20 bits for the command word portion 302 and 20 bits for the data word portion 304. Naturally, other protocols may have data of varying lengths. The 1553 protocol transfers at 1 MB/s, so the original data shown transmits at approximately 1 bit per/μs.

The interface alteration device uses condition evaluation rules to analyze an "evaluation portion", referred to by 306. As used herein, the term "evaluation portion" generally refers to beginning portions of the original data that the interface alteration device compares to the condition evaluation rules to assess whether or not one or more predefined conditions exist to engage the alteration functions of the present invention. In the example of FIG. 3, the region formed by bit 1 to 23 is the evaluation portion 306. However, the evaluation portion could be smaller or larger as needed by the condition evaluation rules to make the determination of whether original data needs to be altered and to provide enough time for the alteration to occur.

In the example of FIG. 3, by bit 14, the interface alteration device has read the command word, the destination address, the transmit/receive bit, and sub address defined in the command word portion 302. By this time, the interface alteration device has enough information to be able to determine whether the signal is a command as opposed to a status and whether data may need to be altered. In the example of FIG. 3, the interface alteration device can also determine the word count found in bits 15 through 19. In the example of FIG. 3, the interface alteration device has used the evaluation portion to determined an "alterable portion" 312 of original data 300. The "alterable portion" includes data that can be overdriven by the interface alteration device.

In the example of FIG. 3, a parity bit 20 and three synch bits 21 through 23 provide a sufficient amount of time (4 μs) to decide whether to alter any portion of the alterable portion 312. For 1553 protocol, 4 μs is sufficient for an FPGA or finite state machine to make a decision and then implement any overdriving function, including accessing any alteration rules to perform the overdrive function.

The alterable portion 312 of incoming data 300 is then received by the receiving transceiver. In the example of FIG. 3, the alterable portion includes 16 data bits (bits 24 through bits 39) and one parity bit (bit 40). The original data in each bit will be copied and transmitted by the transmitting transceiver unless an alteration is made to a bit. If an alteration is made to the bit, the interface alteration device identifies alteration rules and makes the alteration accordingly. The altered data is then transmitted onto the outgoing segment by the transmitting transceiver.

In the example of FIG. 3, note that the interface alteration device is transmitting substantially simultaneously as it is being received, and does not need to store or buffer the incoming data. So, in the example of FIG. 3, by 40.04 μs from when the original data 300 was first received by the receiving transceiver, all of the transmitted data 300' has been transmitted onto the outgoing segment of the communication line. The transmitted data 300' is similar to the original data 300 except that bits 25, 28 and 37 of transmitted data 300' are altered bits 320, while all the rest are copies of the original data. Note that in this case the changes to bits 25, 28, and 37 did not require a change in the parity bit 40. Thus, like the original data, in this example, the transmitted data 300' has a command word (referred to as 302') and a data word (referred to as 304').

Further, because the latency falls well below time limits of the protocol, the destination node will receive the transmitted data 300' within transmission tolerance levels. Furthermore, the destination node will not be able to detect that the transmitted data 300' was altered during transmission and will proceed to process the transmitted data 300' accordingly.

Although not shown, it will be appreciated that the interface alteration device can log the command word, data word, and/or any status indicators received remotely to the external source at any time after it is received by the receiving transceiver. Because logging can occur substantially in real-time with receipt of the incoming data, during the evaluation portion 306, an external source could be analyzing the incoming data, generating or accessing alteration rules, and transmitting alteration rules to the interface alteration device. In one embodiment, the alteration rules is received by the interface alteration device just prior to when the transmitting transceiver is going to transmit the particular data portion that is going to be overdriven, which allows the interface alteration device to make a "just in time" alteration of the data before it is transmitted.

While most examples herein will describe adding or modifying the original data and retransmitting a modified data portion, "alteration" broadly includes any way of modifying the original data including, but not limited to, adding data, replacing data, modifying data, deleting data, or even refusing to transmit data. Alteration could thus be used to terminate a data transmission by altering the number of bits that are transmitted or some other way such that the destination node will invalidate it or refuse to acknowledge the signal. Altering can thus include deleting or refusing to transmit original data so that the destination node does not receive the entire original data, which will be inherently rejected by the protocol.

The scenario shown in FIG. 3 is provided as an example only and other design configuration for defining the evaluation portion, using condition evaluation rules, defining an alterable portion, using alteration rules, and using transmission tolerance levels are discernable once the signal protocol and/or system-level protocols are known. For example, the above teachings can be applied to other data transmit protocols such as, but not limited to, Ethernet, Carrier Sense Multiple Access (CSMA), Time Division Multiple Access (TDMA), ARINC 429, continuous analog, RS-232 and RS-422 and similar serial protocols, Universal Serial Bus, discrete signals (which remain in one state for a long time compared to the state transition time), and the like. In one example, the above features could be implemented for a continuous analog signal in which the condition evaluation rules dictate searching for a particular range of transmission level of the original signal (e.g., between −5 to +5 volts). When the defined condition is identified, the alteration rules could instruct the transmitting transceiver to transmit the signal 2× the original signal. Furthermore, the transmission tolerance levels could have a signal protocol limit of +15 volts, so any transmission that exceeds this limit is trimmed to +15 volts. This is an example of selective transmission alteration in which the alteration occurs for when a particular condition is found, and may or may not apply to the entire signal. Further, this is an example of a transmission tolerance level that does not necessarily rely on timing requirements.

Figure 4A:
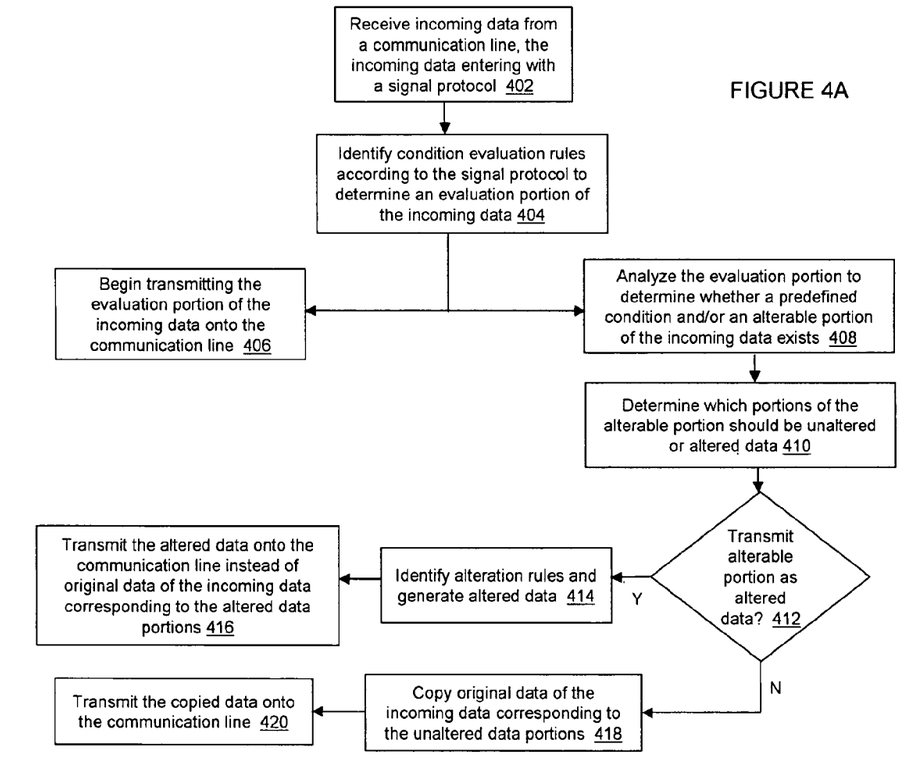
FIG. 4A illustrates an embodiment of a method for performing selective multi-modal transmission alteration incorporating features of the invention.
Figure 4B:
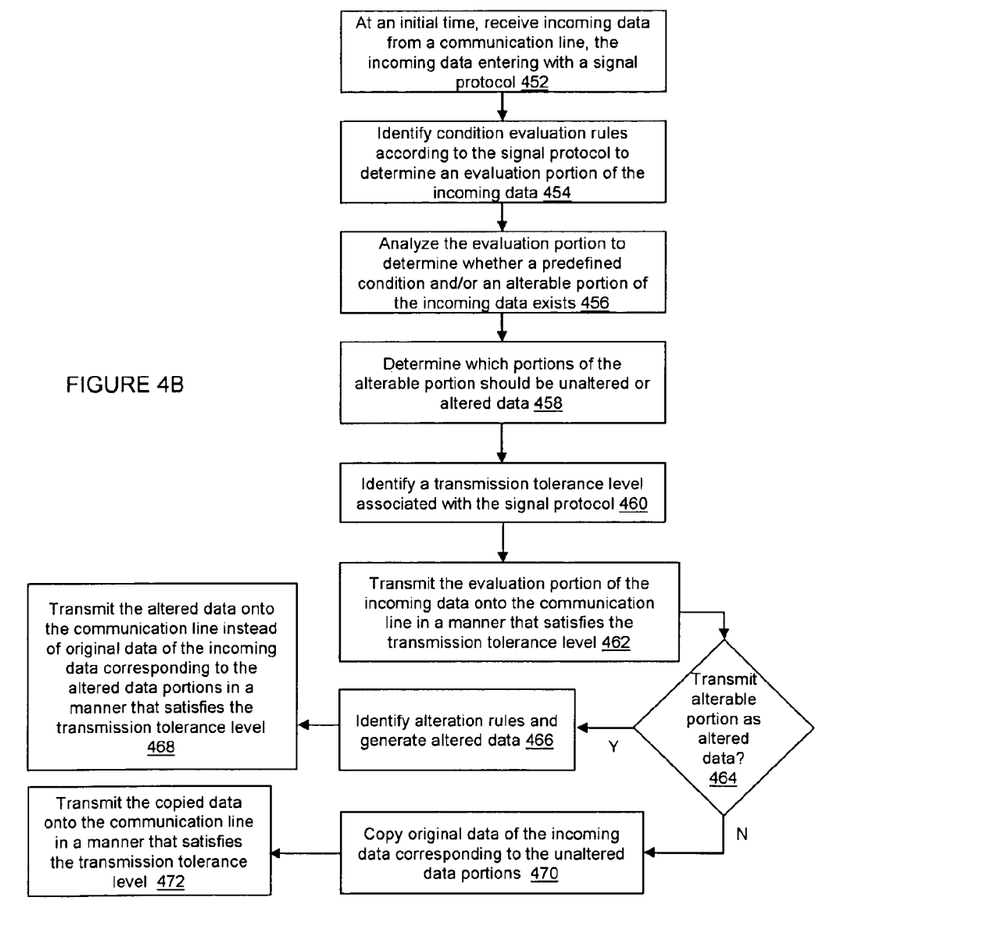
FIG. 4B illustrates another embodiment of a method for performing selective multi-modal transmission alteration incorporating features of the invention.

Turning to FIGS. 4A and 4B, exemplary methods will be described. FIG. 4A describes a method in which the evaluation function and alteration functions overlap. In one embodiment, the incoming data and outgoing data can be transmitted substantially in real-time while still enabling the alteration functions of the present invention.

At 402, the receiving transceiver receives incoming data from a first segment of a communication line. The incoming data enters with a signal protocol that allows the interface alteration device to determine condition evaluation rules, alteration rules, and/or transmission tolerance levels.

At 404, the alteration processor identifies condition evaluation rules to determine an evaluation portion of the incoming data based on the signal protocol. At 406, the transmitting transceiver begins transmitting the evaluation portion of the incoming data onto a second segment of the communication line.

At 408, the alteration processor analyzes the evaluation portion to determine whether an alterable portion of the incoming data exists. At 410, the alteration processor uses condition evaluation rules to determine which portions of the alterable portion should be transmitted as unaltered data or altered data.

At 412, the alteration processor determines whether the alterable portion should be transmitted as altered data or unaltered data. If data in the alterable portion should be transmitted as altered, at 414, the alteration processor identifies alteration rules and generates altered data according to the alteration rules. At 416, the transmitting transceiver transmits the altered data onto the second segment of the communication line instead of original data of the incoming data corresponding to the altered data portions.

If the data in the alterable portion should be transmitted as unaltered, at 418, the transmitting transceiver copies original data of the incoming data corresponding to the unaltered portion. At 420, the transmitting transceiver transmits the copied data onto the second segment of the communication line.

FIG. 4B illustrates another embodiment of a method of the invention in which the transmission tolerance level do not require the evaluation and transmission of the data stream to overlap. In FIG. 4B, at 452, at an initial time, the receiving transceiver receives incoming data from the first segment of the communication line, the incoming data entering with a signal protocol. At 454, the alteration processor identifies condition evaluation rules to determine an evaluation portion of the incoming data based on the signal protocol. At 456, the alteration processor analyzes the evaluation portion to determine whether an alterable portion of the incoming data exists. At 458, the alteration processor uses condition evaluation rules to determine which portions of the alterable portion should be transmitted as unaltered data or altered data. At 460, the alteration processor identifies a transmission tolerance level associated with the signal protocol and/or system-level protocols.

At 462, the transmitting transceiver transmits the evaluation portion of the incoming data onto a communication line at a point in time after the initial time such that transmission of the evaluation portion satisfied the transmission tolerance level requirements. At 464, the alteration processor uses condition evaluation rules to determine which portions of the alterable portion should be transmitted as unaltered data or altered data. If data in the alterable portion should be transmitted as altered, at 466, the alteration processor identifies alteration rules and generates altered data according to the alteration rules. At 468, the transmitting transceiver transmits the altered data onto the second segment of the communication line instead of original data of the incoming data corresponding to the altered data portions. If the data in the alterable portion should be transmitted as unaltered, at 470, the transmitting transceiver copies original data of the incoming data corresponding to the unaltered portion. At 472, the transmitting transceiver transmits the copied data onto the second segment of the communication line.

FIGS. 4A and 4B are only two examples of methods that could be implemented according to the teachings of the present invention.

While protocols having serial transmissions have been described in the examples, it will be appreciated that the above teachings and methods can also apply to other protocols, including multi-packet transmissions. Various protocols, such as Ethernet, exist which send data in the form of multiple packets that must be reassembled in order to ascertain the entire message. Most multi-packet protocols include algorithms which define probabilities for a packet successfully being delivered to the intended destination. Thus, the present invention can ascertain a transmission tolerance level from the signal protocol and/or system-level protocol to determine transmission limits for multi-packet transmissions. Generally, since these multi-packet protocols account for packets being sent out of order, lost data packets, collisions, etc., and the present invention does not rely on whether data is received in a certain order, the present invention can still apply to multi-packet transmissions.

The transmission tolerance level can be ascertained from the signal protocol and/or system-level protocols. For multi-packet configurations, the alterable data may be ascertained from the first packet that is received by evaluating the packet header information, even if the first packet arrives out of order from the packet grouping. Thus, at least a portion of the packet header could be an "evaluation portion" for purpose of the present invention. In another example, an XML file sent before or with data packets can form the evaluation portion. Other protocols tag data which can serve as the evaluation portion. The interface alteration device can evaluate the packet, determine whether or not any of the packet data needs to be altered and transmit the packet onto it destination. The interface alteration device can then wait for the other packets in the group to arrive and make changes as they arrive. Or, alternatively, some protocols, will allow the interface alteration device to buffer all data packets in a group and then transmit the group together with any alterations as long as it meets the transmission tolerance level requirements.

Because most multi-packet protocols do not rely on the packets being received in a particular order, and since the present invention could transmit data either serially and/or reordered, multi-packet data can fall under one of the two methods described in FIGS. 4A and 4B or any other method that could be conceived based on the teachings of the present invention. The present invention is thus based on the premise that as long as the destination node receives the entire message within the probability defined by the protocol, the interface alteration device can serve to perform valuable data alteration without interrupting the system processes. For example, if a protocol has an end-to-end timing by which all packets in a message need to be received, the present invention can transmit those data packets in any order and so long as it satisfies the transmission tolerance level timing requirement.

The interface alteration device can be built as an integrated piece into a large complex system that can be used in all phases of testing, simulation, and live commercial phases. Or, can be built as a modular unit that can conform to form factor standards (such as avionic) such that it can be sold off-the-shelf. Once the teachings of the present invention are understood, the applications of the invention are limitless. A few examples are appropriate.

Figure 5:
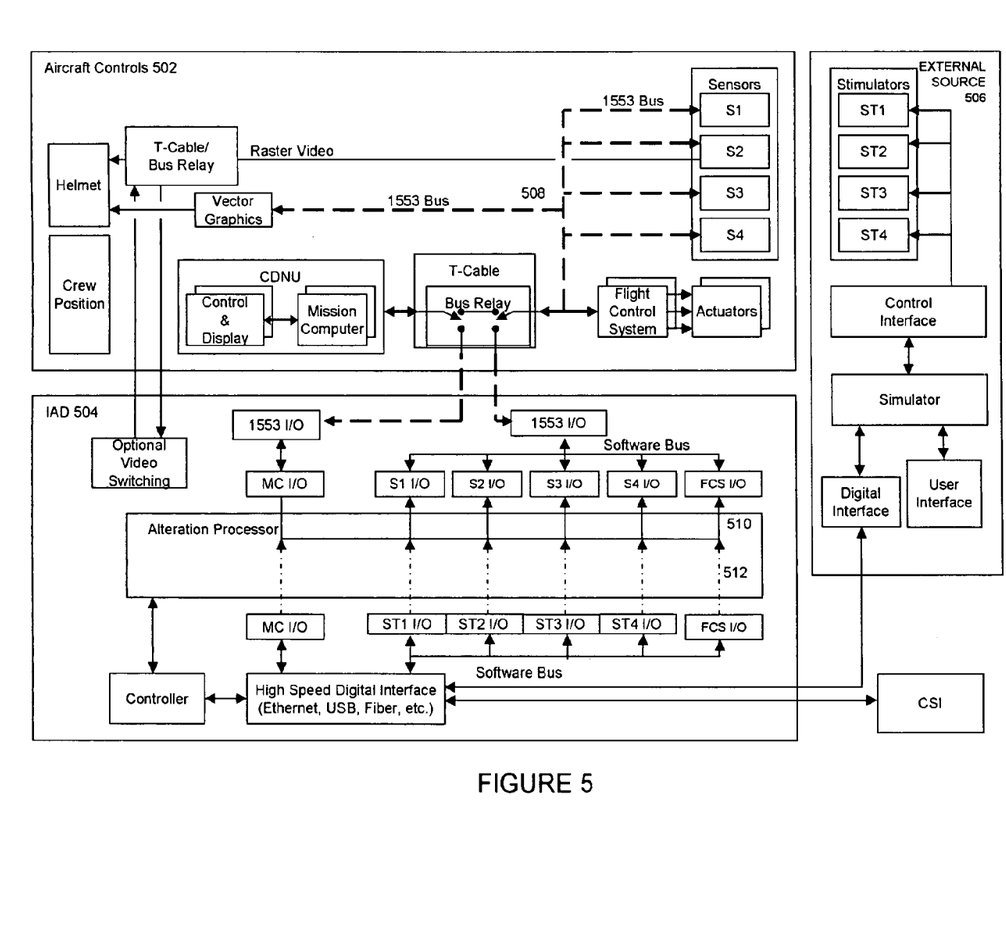
FIG. 5 illustrates an example of an avionics system in which an interface alteration device of the present invention may be implemented.

One potential use of the present invention is to modify flight controls for a piloted aircraft. FIG. 5 illustrates one embodiment of how this can be implemented. Many of the elements of FIG. 5 are known to those of skill in the art, so will not be described in detail here. FIG. 5 depicts aircraft controls 502 having a bus that operates using a 1553 protocol, shown by the heavy dashed lines 508. The interface alteration device 504 breaks the bus communication line using the combination T-cable and bus relay. The interface alteration device 502 enables alteration of data occurring in the communication line that, without device 502, would normally come from the control display navigation unit (CDNU—shown as the control & display and the mission computer). The interface alteration device would be able to communicate with an external source 506 via terrestrial and/or aerial means, such as broadcast towers and/or satellites which can transmit and/or receive data to and/or from the interface alteration device.

In this embodiment, the source node for data transmissions on the communication line could be the CDNU while the destination node could be the flight control system, sensors, actuators, and/or vector graphics device. The alteration processor routes commands in either a pass through mode, shown by solid lines 510. The alteration processor can also route altered data as shown by the light dashed lines 512. Furthermore, the alteration processor could route emulation data in the event without data being required to have been received from the incoming transceiver. While not shown, it will be appreciated that the alteration processor is a combination of hardware and/or software that enables the alteration functions of the present invention.

In another embodiment, the interface alteration device is able to communicate with a crew station interface (CSI) to allow a human operator to interact with the system as follows.

During operation, the pilot in the cockpit will not be able to discern a difference between normal flight operations and altered flight operations generated by the interface alteration device since the data alterations will comply with transmission tolerance levels. So, the aircraft would be able to experience fully piloted commands, a combination of piloted commands and altered commands from the external source, or fully altered commands from the external source. In one example, the interface alteration device can enhance the safety of an aircraft by being able to test flight conditions and being able to actually remotely control the operation of the aircraft.

The avionics example of FIG. 5 is provided by way of example only. The invention could be applied to any manned vehicle. Thus, in one exemplary implementation, the present invention can be applied to an avionics system in which the interface alteration device can be used to simulate a flying or grounded, partial, or complete aviation electronics system into arbitrary states as defined by the avionics interfaces. The present invention could also be applied to autonomous control of a manned vehicle to selectively remove some or all information transfers from a node or system and redirect them to other local or external systems to enable autonomous control of the manned vehicle.

Figure 6:
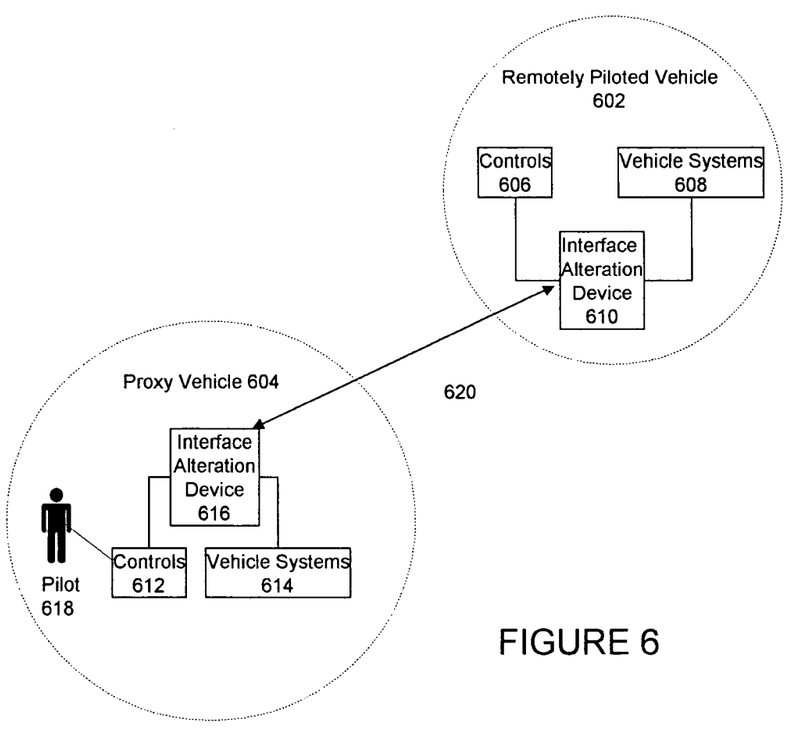
FIG. 6 illustrates an example of a remotely piloted vehicle system in which an interface alteration device of the present invention may be implemented.

FIG. 6 shows another application which allows for a completely autonomous vehicle. FIG. 6 shows a remotely piloted vehicle 602 and a proxy vehicle 604. Both the remotely piloted vehicle 602 and the proxy vehicle 604 have controls 606, 612 and a vehicle system 608, 614, respectively. The pilot 618 is able to sit at the proxy vehicle 604 and manipulate the controls 612 and at the proxy vehicle as if the pilot were sitting in the remotely piloted vehicle 602 itself.

An interface alteration device 610, 616 sits at both the remotely piloted vehicle 602 and the proxy vehicle 604, respectively, between the controls and vehicle system. A data link 620 is generated between the two interface alteration devices 610, 616 so that the proxy vehicle 604 can generate emulation data to be transmitted to the remotely piloted vehicle 602. Further, interface alteration device 610 at the remotely piloted vehicle 602 would capture system data from the remotely piloted vehicle to be transmitted to the proxy vehicle 604 so that the proxy vehicle can react to actual flight conditions.

For example, a fly-by-wire aircraft can be used as a proxy ground station for a remotely piloted aircraft. On the proxy aircraft the interface alteration device is connected between the pilot's controls and the flight control computer and/or any internal communication channels as necessary for the level of control desired. Another interface alteration device is connected similarly in the remote aircraft. The two interface alteration devices communicate by means of a datalink or similar communication channel. Control inputs on the proxy ground station are monitored by the interface alteration device and transmitted to the remote aircraft. The remote aircraft's interface alteration device receives the signals form the proxy ground station and manipulates the controls on the remote aircraft accordingly. In a similar fashion, data is monitored and sent to the proxy ground station as needed to provide the ground station systems and pilot sufficient data to remotely pilot the aircraft. Data is manipulated in the proxy ground station to keep the aircraft stationary while providing feedback to the pilot. Data is manipulated in the remote aircraft to ignore the local controls and use the remotely generated instructions.

This application is not limited to a stationary proxy; it can also be used to slave other operator-less systems to a single manned system. Delay or other more advanced logic can be applied to adapt the slave system or systems into a convoy.

The proxy control does not have to be manned. This application can be used for any partially or fully autonomous system to remotely control one to N other systems.

Those of skill in the art will appreciate the great commercial and economical advantages to being able to modify piloted controls and/or to generate a completely autonomous aircraft.

Furthermore, those of skill in the art will appreciate that the interface alteration process and system can be applied to any information transmission protocol to alter any system that reaches states based on information received through a signaling interface. The concepts of the present invention can be applied to other communication standards on any transmission medium including optical fiber, Ethernet, Carrier Sense Multiple Access (CSMA), Time Division Multiple Access (TDMA), ARINC 429, continuous analog, RS-232 and RS-422 and similar serial protocols, Universal Serial Bus, discrete signals (which remain in one state for a long time compared to the state transition time), and the like. The signals can be any medium—optical, electrical, carrier wave, pneumatic, pressure, acoustic, radio, and the like.

Embodiments include general-purpose and/or special-purpose devices or systems that include both hardware and/or software components. Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in the systems of the present invention, the computer program product having a physical computer-readable medium having computer readable program code stored thereon, the computer readable program code comprising computer executable instructions that, when executed by processor, cause the system to perform the methods of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A data alteration device configured to be placed between a first segment and a second segment of a communication line, the communication line being placed between a first node and a second node of a network, the device comprising:
   a first port configured to receive an incoming data stream from the first segment of the communication line, the incoming data stream entering with a signal protocol;
   an interface alteration processor configured to:
      identify condition evaluation rules corresponding to the signal protocol to determine an evaluation portion of the incoming data stream;
      use the condition evaluation rules to determine whether one or more predefined conditions exists and to determine portions of the incoming data stream to be transmitted as altered data;
      for each portion of the incoming data stream determined to be transmitted as altered data, identify alteration rules and generate altered data according to the alteration rules;
      generate an outgoing data stream that is a replicate of the incoming data stream except that the portions of the incoming data stream identified to be transmitted as altered data are replaced with the corresponding altered data; and
      determine a total delay allowed in receiving, processing, and re-transmitting a signal based on at least one of the signal protocol and a system-level protocol by which the outgoing data stream should be transmitted onto the second segment of the communication line; and
   a second port configured to transmit the outgoing data stream onto the second segment of the communication line at a point in time after the incoming data stream is received at the first port that is less than or equal to the total allowed delay, to be delivered to the second node, the second port being configured to begin transmission of the outgoing data stream before the evaluation portion of the incoming data stream has been completely received at the first port.

2. The device as recited in claim 1, further comprising a third port configured to receive condition evaluation rules and alteration rules from an external source.

3. The device as recited in claim 1, further comprising a storage configured to store condition evaluation rules and alteration rules from an external source.

4. A system comprising:
   an aircraft system; and
   a data alteration device as recited in claim 1, wherein the first port receives the incoming data stream from a source node in the aircraft system and the second port transmits the outgoing data stream to a destination node in the aircraft system.

5. A system comprising:
   flight simulation software comprising a flight control similar to one located in an aircraft system; and
   a data alteration device as recited in claim 2, wherein the external source is the flight simulation software and the third port receives the condition evaluation rules and alteration rules from the flight simulation software.

6. A system comprising:
   a remotely piloted vehicle having a control system and a vehicle system;
   a proxy vehicle; and
   a data alteration device as recited in claim 2, wherein the first port receives the incoming data stream from the control system and the second port transmits the outgoing data stream to the vehicle system, and the third port receives the condition evaluation rules and alteration rules from another system having an interface alteration processor located at the proxy vehicle.

7. A method for altering data in a communication line between a first node and a second node, the first node transmitting data on a first segment of the communication line and the second node receiving data on a second segment of the communication line, the method comprising:
   receiving an incoming data stream from the first segment of the communication line, the incoming data stream comprising an evaluation portion and an alterable portion, the incoming data stream entering with a signal protocol having a total delay allowed in receiving, processing, and re-transmitting a signal associated therewith;
   identifying condition evaluation rules corresponding to the signal protocol to determine the evaluation portion of the incoming data stream;
   analyzing the evaluation portion of the incoming data stream to determine whether one or more predefined conditions exist therein;
   determining portions of the alterable portion of the incoming data stream to be transmitted as altered data;
   for each portion of the alterable portion of the incoming data stream determined to be transmitted as altered data, identifying alteration rules and generating altered data according to the alteration rules; and
   transmitting an outgoing data stream onto the second segment of the communication line, the outgoing data stream being a replicate of the incoming data stream except that the portions of the incoming data stream identified to be transmitted as altered data are replaced with the corresponding altered data, the transmission of the outgoing data stream on the second segment of the communication line being started before the evaluation portion of the incoming data stream has been completely received on the first segment of the communication line, wherein the outgoing data stream is transmitted at a point in time after the incoming data stream is received from the first segment that is less than or equal to the total allowed delay associated with the signal protocol.

8. The method as recited in claim 7, wherein the signal protocol is a MIL-STD-1553 protocol.

9. The method as recited in claim 7, wherein the signal protocol is a multi-packet protocol.

10. The method as recited in claim 7, wherein the latency between receiving the incoming data stream from the first segment of the communication line and transmitting the outgoing data stream onto the second segment of the communication line is less than 0.5 μs.

11. The method as recited in claim 7, wherein generating altered data according to the alteration rules comprises at least one of adding data to, deleting data from, replacing data, and modifying data in the incoming data stream.

12. The method as recited in claim 7, wherein the incoming data stream is idle data or null data.

13. The method as recited in claim 7, wherein transmission of the evaluation portion of the outgoing data stream is begun before the analysis of the evaluation portion of the incoming data stream has been completed.

14. The method as recited in claim 7, wherein transmission of the evaluation portion of the outgoing data stream is begun before the determination has been made as to which portions of the alterable portion of the incoming data stream are to be transmitted as altered data.

15. A method for altering data in a communication line between a first node and a second node, the method comprising:
at an initial time, receiving an incoming data stream from a first segment of a communication line, the incoming data stream entering with a signal protocol;
identifying an evaluation portion of the incoming data stream based on the signal protocol;
analyzing the evaluation portion of the incoming data stream to determine whether one or more predefined conditions exist therein;
determining portions of the incoming data stream to be transmitted onto the second segment of the communication line as altered data;
identifying a total delay allowed in receiving, processing, and re-transmitting a signal associated with at least one of the signal protocol and a system-level protocol;
for each portion of the incoming data stream determined to be transmitted as altered data, identifying alteration rules, and generating altered data according to the alteration rules; and
transmitting an outgoing data stream onto the second segment of the communication line, the outgoing data stream being a replicate of the incoming data stream except that the portions of the incoming data stream identified to be transmitted as altered data are replaced with the corresponding altered data, the transmission of the outgoing data stream on the second segment of the communication line being started before the evaluation portion of the incoming data stream has been completely received on the first segment of the communication line,
wherein the outgoing data stream is transmitted at a point in time after the initial time that is less than or equal to the total allowed delay associated with the signal protocol or the system-level protocol.

16. The method as recited in claim 15, wherein the total allowed delay associated with the signal protocol is such that the evaluation portion must be transmitted substantially simultaneously with the initial time, such that analyzing the evaluation portion and determining the portions of the incoming data stream to be transmitted onto the second segment of the communication line as altered data occur while the outgoing data stream is being transmitted onto the second segment of the communication line.

17. The method as recited in claim 15, wherein the total allowed delay associated with the signal protocol or the system-level protocol defines a maximum amount of time allowed between the start of reception of the incoming data stream from the first segment of the communication line and the start of transmission of the outgoing data stream on the second segment of the communication line.

18. The method as recited in claim 15, wherein the first segment of the communication line has a source node located in an aircraft system, and wherein the second segment of the communication line has a destination node located in an aircraft system.

19. The method as recited in claim 15, wherein identifying alteration rules comprises receiving alteration rules from an external source just prior to generating altered data.

* * * * *